United States Patent [19]

Blumer

[11] Patent Number: 4,515,756

[45] Date of Patent: May 7, 1985

[54] PROCESS FOR EXTRACTING TUNGSTEN OR MOLYBDENUM FROM SOLUTION

[75] Inventor: David J. Blumer, Huntington Beach, Calif.

[73] Assignee: Occidental Research Corporation, Los Angeles, Calif.

[21] Appl. No.: 214,810

[22] Filed: Dec. 9, 1980

[51] Int. Cl.$^3$ .................. C01G 39/00; C01G 41/00
[52] U.S. Cl. ..................... 423/54; 423/DIG. 14; 75/101 BE; 210/684
[58] Field of Search ............. 423/54, DIG. 14, 658.5; 75/101 BE; 210/684

[56] References Cited

U.S. PATENT DOCUMENTS

| | | | |
|---|---|---|---|
| 3,332,737 | 7/1967 | Kraus | 423/24 |
| 3,804,945 | 4/1974 | Scott et al. | 423/22 |
| 3,848,049 | 11/1974 | Ronzio et al. | 423/58 |
| 4,278,643 | 7/1981 | Natansohn et al. | 423/54 |
| 4,279,869 | 7/1981 | Coulson | 423/54 |

FOREIGN PATENT DOCUMENTS 586482 11/1959 Canada .................. 423/54

*Primary Examiner*—Herbert T. Carter

*Attorney, Agent, or Firm*—Robert J. Baran; Forrest E. Logan

[57] ABSTRACT

A process for the recovery of molybdenum and/or tungsten from a solution which comprises the steps of passing said solution through a packed column containing an adsorbent; adsorbing tungsten and/or molybdenum on said adsorbent; passing a solution depleted in tungsten and/or molybdenum from said column; passing a stripping solution through said column containing tungsten and/or molybdenum on said adsorbent to remove tungsten and/or molybdenum with said stripping solution; repeating the first four steps until the stripping solution contains at least about 1 gram per liter of tungsten and/or molybdenum; passing said solution containing at least about 1 gram of tungsten and/or molybdenum per liter into a recovery zone; adjusting the pH of said stripping solution containing at least about 1 gram per liter of tungsten and/or molybdenum to approximately 13.0 by addition of a strong acid and thereby raising the temperature of said solution at least about 10° C.; adding a calcium ion-containing solution to said pH adjusted solution to precipitate calcium tungstate and/or calcium molybdate; and, recovering said tungsten and/or molybdenum as calcium tungstate and/or calcium molybdate.

20 Claims, 3 Drawing Figures

PROCESS FOR EXTRACTING TUNGSTEN OR MOLYBDENUM FROM SOLUTION

FIELD OF THE INVENTION

The instant invention relates to the process for removing tungsten and/or molybdenum, for example the tungstate or molybdate anion, from aqueous solutions, e.g. brines by, contacting such solutions with a high-surface area, hydrous oxide of iron.

BACKGROUND OF THE PRIOR ART

The use of hydrous oxide ion exchangers, including both anion and cation exchangers, as adsorbents for separating inorganic ions from solution is disclosed in U.S. Pat. Nos. 3,332,737 and 3,382,034. The patentee points out certain advantages of the materials disclosed and claimed over the prior art adsorbents or ion exchangers such as silicates, clays, zeolites, and organic resinous exchangers, etc. Such advantages include improved stability to acids, bases, oxidizing and reducing agents, temperature, and radiation from radioactive ions. The patentee further points out that ferric oxide has been used as an inorganic absorbent. However, it is noted that ferric oxide is in a class of inorganic adsorbents having low ion capacity and/or low selectivity. In the U.S. Pat. No. 3,382,034 it is disclosed that Group VI hydrous oxide ion exchangers may be used to remove anions such as chrominum, molybdenum and tungsten. Although ferric oxide is mentioned in both of these patents as an adsorbent there is no teaching that ferric oxide may be used to remove the molybdenum or tungsten anions noted above.

U.S. Pat. No. 3,476,553 discloses a process for recovering metals from metal-containing solutions by precipitating the metals as insoluble metal hydroxide floccules or insoluble basic salts or hydroxides. The metal-containing, insoluble hydroxides or salts are subsequently collected by contacting with a surface-active collector that is ionically charged. The surface-active collector is adsorbed at the surface of the metal-containing, insoluble hydroxide or salts to form a complex and the complex is removed by bubbling gas throughout the solution to buoy the complex and allow it to rise to the surface.

U.S. Pat. No. 3,804,945 discloses the use of gels for extracting metal values from solution by passing the solution through a column of dehydrated gel. Although ferric oxide is disclosed as a suitable gel, there is no disclosure that it can be used to remove tungsten values from solution.

U.S. Pat. No. 3,931,007 discloses the treating of waste waters with iron compounds such as $\alpha$-FeOOH, $\gamma$-FeOOH, and $Fe_3O_4$ to remove dissolved heavy metals. This reference does not teach the extraction of tungsten or molybdenum and in addition, the iron compounds are formed in situ.

Processes for separating tungsten and molybdenum values from solution are known in the art. For example, U.S. Pat. No. 1,292,559 (to Andersen) discloses a process for separating tungsten compounds from, e.g., "an alkaline solution of tungstic aacid." In the process, ferric sulfate may be added to complex with the tungstic ions. The U.S. Pat. No. 2,962,349 (to Anglin) discloses a method of recovering tungstates from dilute solutions thereof by precipitation with, for example, a water soluble salt of iron.

U.S. Pat. No. 3,510,273 (to Fitzhugh et al) discloses a method for the recovery of molybdenum from aqueous solutions thereof by the addition of metallic iron. U.S. Pat. No. 3,758,665 (to Vojkovic) discloses a method of recovery of metals including tungsten and molybdenum from aqueous solutions thereof by precipitation with a ferric salt. None of these patents, however, make any direct reference to the use of iron hydroxyoxides as an inorganic adsorbent for the recovery of such tungsten or molybdenum values.

Many workers have studied the preparation of various iron oxides and hydroxides by precipitation from aqueous solutions. See, for example, G. Brauer, "Handbook of Preparative Inorganic Chemistry," Volume 2, 2nd Edition, Academic Press (1965) New York. It will be noted that such workers did not isolate the preferred hydrous oxide of iron claimed hereinbelow, nor did such worker utilize iron oxides or hydroxides for the extraction of molybdenum and/or tungsten from solution.

BRIEF SUMMARY OF THE INSTANT INVENTION

The instant invention relates to a process for removing tungsten and/or molybdenum from solution by contacting such solution with an adsorbent comprising a high-surface area hydrous oxide of iron. The high-surface area hydrous oxide of iron which is utilized in the process of the instant invention may be prepared by precipitation from an aqueous solution containing ferric nitrate or other fully dissociated iron salt by contacting said ferric nitrate with ammonium hydroxide or other weak base at certain critical conditions which are described below. The precipitate is an orange-reddish ferric hydroxide which is separated from the solution, washed with a minimum amount of water, dried at a temperature from about 60° to 150° C., and then gently ground to yield black granules. The process for preparing the instant hydrous oxide of iron, its use in removing molybdenum and tungsten from solutions, as well as the hydrous oxide of iron, itself, are novel.

The tungsten and the molybdenum are preferably in the form of the tungstate or the molybdate anion and are removed by adsorption at the surface of the insoluble high-surface area hydrous oxide. The tungsten and/or the molybdenum may be recovered from such high-surface area hydrous oxide by contacting with an extraction solvent, such as an aqueous solution having a pH greater than the pH of the tungsten or molybdenum containing solution from which the tungsten or molybdenum is adsorbed.

DETAILED DESCRIPTION OF THE INVENTION

Figure 1:
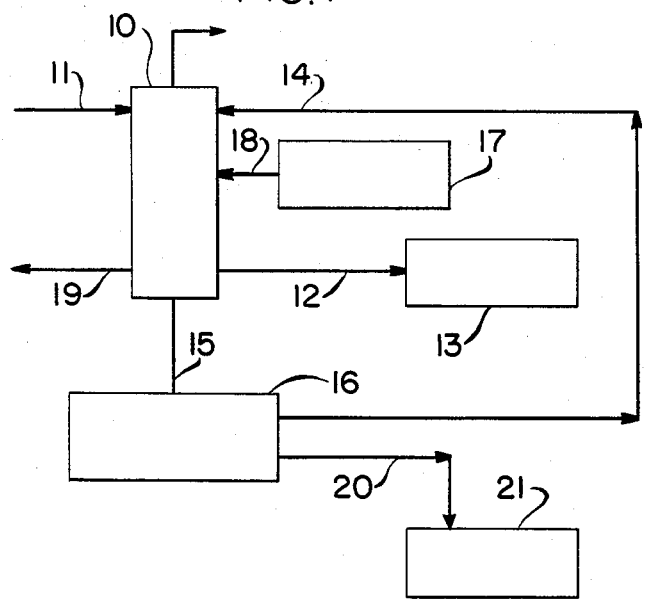
FIG. 1 illustrates a flow diagram of a process of this invention for the separation of tungsten from a Trona brine by adsorption of tungstate ion on a hydrous oxide of iron adsorbent.

The instant invention relates to a novel high surface area, hydrous oxide of iron and the use thereof in a process for the removal of tungsten or molybdenum from an aqueous solution containing their salts by contacting such solution with said novel, high-surface area hydrous oxide of iron. The novel, high surface area, hydrous oxide of iron may be prepared by precipitating such hydrous oxide of iron from an aqueous solution, by contacting said aqueous solution containing dissolved ferric nitrate with ammonium hydroxide. Other ferric salts which are highly dissociated in aqueous solutions are also suitable for preparing the iron hydrous oxide useful in the instant invention. Specifically excluded from use in preparing the instant novel, high-surface area, hydrous oxides of iron are ferric chloride and ferric sulfate. These ferric salts have anions which tend to strongly bind to the ferric ion in aqueous solution and therefore are not highly dissociated. For the purposes of this invention "highly dissociated salt" shall mean a salt which is similar to ferric nitrate, e.g. ferric perchlorate. This property can be measured by optical adsorption spectroscopy or extended X-ray absorption fine structure spectroscopy of the aqueous solutions.

A weakly basic material such as ammonium hydroxide is preferred for precipitating the ferric salt, however, other weak bases, e.g. amines such as diethylamine, quinoline, etc. may also be suitable. For the purposes of this invention "weak base" shall mean a base $pK_b$ of less than about 1.

The precipitate is a reddish-orange gel-like material of ferric hydroxide which is separated from the solution, for example by filtration or decanting, washed with a minimum volume of water, dried at a temperature of from about 60° to about 150° C. in air or an inert atmosphere, and gently ground to yield black granules comprising the instant novel hydrous oxide of iron in a physical state suitable for contacting with the above solutions of molybdenum or tungsten.

When the iron hydrous oxide is prepared by the above method, it is suitable for use in flow through columns wherein tungsten and molybdenum-containing solutions may be passed therethrough at a higher rate than if other forms of hydrous oxides of iron are used. The material must be carefully ground so as not to result in many fines which would interfere with this desired higher flow rate. It has been found that after drying the hydrous iron oxide may be gently broken into chunks by hand or by use of a roll crusher to yield particles having the desired −35 +100 mesh size. High intensity grinders known in the art would not be suitable for preparing the instant novel hydrous iron oxides.

The hydrous oxides of iron prepared as disclosed above may be used as is and need not be supported on an inert support to obtain high flow rates. The other modifications of physical form known to increase the flow rate of adsorbents are also unnecessary.

The invention is especially suited for removing tungsten from solutions containing low concentrations of tungsten in the presence of higher concentrations of anions, such as carbonate, bicarbonate, sulfate, halide, borate, hydroxide, etc. as well as sodium, potassium, etc. It is known in the art that in solutions of this sort it is difficult to selectively remove the tungsten. In the instant process the tungsten is generally in solution as the tungsten ion and molybdenum is in solution as the molybdate ion.

The pH of solutions containing such high concentrations of buffering anions is also fairly high, i.e. pH's of at least 8, more likely 9, are frequently encountered in such solutions. Examples of such solutions include brines, such as the Trona brines, found in various dry lakes in California. It is appreciated by those familiar with such brines, that an efficient process for the removal of tungstate, or molybdate, from such brines, would be very desirable.

It has been discovered that the high surface area hydrous oxides of iron such as those represented by the general formula:

$$FeO_x(OH)_y$$

wherein x varies from 0 to 1, y varies from 1 to 3, as prepared by the above method, are especially suitable for use in the instant process for the removal of tungsten or molybdenum from aqueous solutions. x and y are preferably selected to satisfy the +3 valence state of iron. Most preferably x is 1 and y is 1. Such special suitability results from the coarse nature of the hydrous oxides of iron prepared by the above process which allows greater throughput than other hydrous oxides of iron when utilized in a column separation process for the removal of molybdenum and/or tungsten.

It is found that the surface area of the hydrous oxides utilized in the instant process is important in relationship to the capacity of such hydrous oxides for molybdate or tungstate. In general, the hydrous oxides disclosed herein will have a surface area, as measured by the BET method, of from about 80 to about 500 m²/gm.

The instant novel hydrous oxide of iron may be contacted with the solution from which it is desired to extract the tungsten or molybdenum metal values in either a fixed bed column or as a slurry, however, the novel physical form allows use of packed columns of such novel hydrous oxide of iron. Therefore, the inherent problems in moving various solutions between contactors and/or strippers found in the prior art slurry processes may be avoided.

An aqueous solution containing tungsten or molybdenum is contacted with the instant novel hydrous oxide of iron, in either the fixed bed or slurry mode, for a time sufficient to substantially deplete such solution of its tungsten or molybdenum values. In general, the pH of the solution will be maintained at at least about 6, since the high-surface area hydrous oxides are unstable at pH's less than about 4. The novel hydrous oxides of the instant invention are most suitable for recovering tungsten or molybdenum from high pH brines, herefore this limitation is not important.

As noted above, the capacity of the instant, high surface area, hydrous oxides of iron disclosed herein is related to the surface area. However, in general, such hydrous oxides may have a capacity from 1 to 20 mg/gm, preferably, from 10 to 20 mg/gm, for tungsten and a substantially equivalent capacity for molybdenum. The capacity for tungsten and molybdenum may vary in accordance with the solution characteristics, i.e. other ions present with tungsten and molybdenum in solution. For example, tungsten and molybdenum dissolved in water may be extracted to a loading of from 10 to 20 milligrams tungsten or molybdenum per gram of adsorbent. However, when the tungsten or molybdenum is being extracted from a brine containing the buffering ions such as carbonate, borate, etc. the capacity may lie in the range of from 1 to 3 milligrams tungsten or molybdenum per gram of adsorbent. However, even this lower capacity is suitable for recovery of molybdenum or tungsten from brine.

The contacting of the molybdenum or tungsten-containing solution with the hydrous oxide will generally take place at ambient temperature and pressure conditions. However, the temperatures of from the freezing point of the solution up to the boiling point may be utilized. For the sake of economy, the solution will be contacted with the hydrous oxide at the temperature at which the solution is available, i.e. ambient.

Contacting may take place for from about 10 to about 60 minutes, or longer, or generally until a substantial portion of the capacity of the instant hydrous oxide is utilized.

In the slurry procedure described below, the aqueous solution will be separated from the high surface area hydrous oxide containing adsorbed molybdenum or tungsten, which is then contacted with a solution to strip the tungsten or molybdenum from the hydrous oxide. In general, a higher pH solution is utilized to remove the tungsten or molybdenum values from the adsorbent, i.e. the pH of the extracting solution should be greater than the pH of the solution from which the tungsten or molybdenum was originally adsorbed. A suitable pH for such extracting solution would be at least 10, preferably at least 13. In the fixed bed column, a flow of higher pH aqueous liquid is passed through the tungsten or molybdenum containing hydrous oxide to elute the adsorbed metal values. Peferably the fixed bed column is washed with water prior to eluting with such higher pH aqueous liquid.

Thus, the present invention also provides a process for concentrating a dilute salt solution of molybdenum or tungsten, i.e. the extracting solution may have a much lesser volume than the solution from which the tungsten and molybdenum is originally adsorbed. Concentrations of at least 20 gms of tungsten and/or molybdenum per liter may thus be obtained by the process of the instant invention.

The process of the instant invention also provides for the separation of tungsten and molybdenum selectively from aqueous solutions containing other interferring ions. For example, the ions such as halides, sulfate, carbonate, bicarbonate, etc., which are present in brine will not be selectively adsorbed and therefore the process will not suffer from the presence thereof.

It has also been found that the instant novel hydrous oxides of iron may be used to selectively separate tungsten from molybdenum. That is, the selectivity of said novel hydrous oxide is 20 times greater for tungsten than for molybdenum.

The instant novel hydrous oxide of iron is a porous, high surface area, non-crystalline, black material characterized as having a substantially uniform distribution of substantially uniform size spherical pores, which are interconnected and therefore provide access by solutions to the interior of said product. Preferably, the spherical pores will have a diameter of from about 320 to about 370Å. This novel material is prepared by a critical preparation wherein specific ferric salts are precipitated from an aqueous solution by a specific type of base at carefully controlled conditions. The precipitate is washed and dried at controlled conditions to yield a friable material which may be gently crumbled to provide a particulate material preferably having a mesh size of $-35 +100$. In this form it is suitable for use in a packed column extraction and will provide enhanced throughput as compared to other iron oxide and iron hydroxide adsorbents.

The use of various ferric salts were evaluated in the preparation of the instant hydrous oxide of iron. It was found that ferric chloride and ferric sulfate, unlike ferric nitrate, did not give the desired product. It is believed that the chloride and sulfate ions tend to bind to the iron fairly strongly in aqueous solution as compared to the nitrate. In some as yet not understood manner it appears that completely dissociated ferric salts, such as the nitrates, are critical to the preparation of the hydrous oxide of iron having the above-described properties. It was found, that when ferric chloride and ferric sulfate were utilized, the precipitate upon drying was a reddish-brown colored material having virtually no particle integrity. When these materials were utilized to extract tungsten from brine, a large amount of fines and colloidal particles were generated which decreased the throughput of the packed column. Furthermore, the tungsten loading capacities of sulfate and chloride product was inferior to the nitrate product.

While a precipitate of an iron salt from an aqueous solution can be obtained by use of virtually any base, it was discovered that the only bases capable of producing the desired hydrous oxide of iron was ammonium hydroxide and other weak bases. Strong bases, such as sodium hydroxide and potassium hydroxide, which were evaluated for preparing the novel hydrous oxide of iron, did not yield the desired product. These materials differ from weak bases in that they are completely dissociated in aqueous solution, however, such strong bases also differ from ammonium hydroxide in their approximate hydration numbers of 16.6 and 10.5, respectively. It is believed that the known ability of ammonium hydroxide and the like to form three dimensional structures in aqueous solutions (by cross linking water molecules) act to provide the instant desired characteristics for the hydrous oxide of iron.

It also has been found that if the base is added to the ferric nitrate over a period of more than, for example, an hour, undesirable crystalline products are obtained. Therefore, in preparing the desired hydrous oxide of iron disclosed herein the ammonium hydroxide or similar base should be added to the ferric nitrate solution and the solution be allowed to precipitate over a period of no more than about one hour.

It has also been found that due to the known tendency of colloids to aggregate in concentrated solutions the solutions utilized to precipitate the precursor to the desired hydrous iron oxide should be suitably dilute. For example, three molar solutions of ferric nitrate and ammonium hydroxide (which produced a black hydrous iron oxide upon drying) was less preferred in that the product is brittle and crumbled and therefore could not be easily converted into a form which was useful in a packed column. Moreover, inferior tungsten loading capacities, were found for the product prepared from the three molar solutions. On the other hand, when the ferric nitrate and the ammonium hydroxide were combined as one molar solutions a desirable product was obtained. More dilute solutions would also be suitable, however, it would be less desirable from the standpoint of requiring the handling of large volumes of solution.

After precipitating the hydrous oxide of iron from solution the precipitate should be washed to remove excess nitrate and ammonium ions from the precipitate before drying. It has been found, however, that where large amounts of wash water are used to wash the precipitate, peptization of the precipitate occurs on the filter resulting in the formation of colloidal particles which are difficult to filter. Besides the resulting loss in yields by the passage of said colloidal particles through the filter, the rate of filtration is decreased. It has also been found that the volume of the wash undesirably affects tungsten capacity of the product. Preferably, the precipitate should be washed with no more than about 5, more preferably no more than about 3 volumes of water, per volume of precipitate.

The desired precipitate which is the precursor to the instant novel hydrous oxide of iron is a reddish-brown material which if allowed to air dry at room temperature will form an admixture of the desired black hydrous oxide of iron and the reddish-brown ferric hydroxide. Air drying will in addition take several weeks for completion. It has been found that preferably when the precipitate is dried between 60° and 150° C. the desired product is obtained. Finally, the dry precipitate must be broken down into smaller particles preferably of uniform size so that utilization in packed columns will show good flow and fluid contact characteristics. The dried precipitate is surprisingly hard and brittle, i.e. friable. If the precipitate is ground to dust with a mortar and pestle, the resulting material is actually reddish-brown colored rather than black, suggesting that a black color is an optical absorption affect of the particles themselves. That is, light impinging on the surface is entirely absorbed with virtually no reflected light. In breaking the dried precipitate into smaller particles the production of fines must be avoided since they contribute to low flow rates in columns as well as cause high pressure drops. It has been found that the dry precipitate may be conveniently ground, by gentle hand grinding or by means of a roll crusher, to a particle size of $-35 +100$ mesh to obtain a material suitable from the standpoint of both rate of absorption of tungsten and the flowthrough of tungsten containing solution.

One aspect of the instant invention may be more conveniently described by reference to FIG. 1 which defines a flow scheme for the separation of tungsten, as the tungstate ion, from a Trona brine by adsorption on a hydrous oxide of iron adsorbent prepared according to the above method, recovery of such tungstate ion, and regeneration of the adsorbent. This flow scheme will also be applicable to the separation of molybdate as well, and as such the flow scheme is novel for the recovery of molybdenum or tungsten by use of the other adsorbents described in the prior art, such as resins useful for extracting tungsten or molybdenum from aqueous solutions. Furthermore, tungsten and/or molybdenum-containing solutions other than a Trona brine are suitable for treatment by the process of the instant invention to recover molybdenum and tungsten values.

A brine containing 70 milligrams of tungsten per liter is passed into column 10 which is packed with an adsorbent comprising the hydrous oxide of iron prepared by the above method. The column will contain 220,000 lbs. of such adsorbent and be of the dimensions 14' diameter and 16' high. The brine is pumped through said column at a rate of from about 1 to about 7 gallons per minute per square foot. The brine upon passing through said column becomes depleted in tungsten and a tungsten-depleted brine is removed at outlet 12 and passed into reinjection well 13. A monitor, not shown, is provided at outlet 12 so that when the tungsten concentration begins to increase the extraction cycle is ceased. A sodium hydroxide solution typically 1 molar and containing from 0 to about 10 grams/liter of sodium hypochlorite is then passed into said column through inlet 14 wherein it contacts the adsorbent containing adsorbed tungsten and removes such adsorbed tungsten therefrom. The stripping solution containing approximately from about 0.5 to about 5 milligrams per liter of tungsten is passed from said column into surge pond 16 through outlet 15. The stripping solution functions suitably at a temperature from about 40° to about 90° C., therefore, surge pond 16 may be thermally connected with a solar heating device to warm the surge pond solution to the appropriate temperature. Auxillary heating devices are also suitable for heating said surge pond solution.

Prior to stripping the adsorbed tungsten, wash water may be passed through the column 10 from wash water reservoir 17 through inlet 18. The wash water is removed at outlet 19 and discarded. Wash water will also be passed through the column prior to resuming the stripping of tungsten from the brine. The sodium hydroxide solution containing dissolved tungsten is recycled back through column 10 for further stripping until the level of tungsten reaches at least about 1 to about 10 grams/liter. The solution is then passed through outlet 20 into tungsten recovery zone 21.

Figure 2:
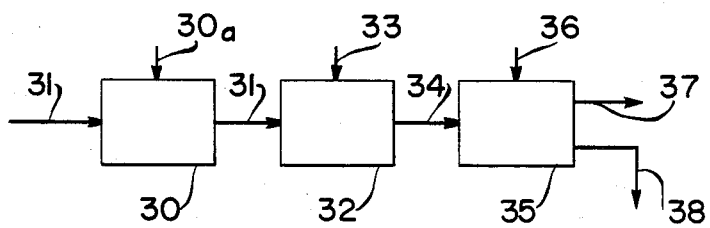
FIG. 2 illustrates a flow diagram of a process of this invention for the recovery of tungsten from a stripping solution from the process of FIG. 1.

Tungsten recovery may be carried out in one of two preferred modes. In FIG. 2 the stripping solution at a pH of 14 containing about 1 gram of tungsten per liter is passed into a pH adjusting zone 30 through inlet 31 which is in fluid communication with tungsten recovery zone 21. The pH of such solution is adjusted to 13 by means of a strong acid, preferably hydrochloric acid which is passed into pH adjusting zone 30 by means of inlet 30a. The pH adjusted solution is then passed through outlet 31 which is in fluid communication with calcium chloride addition zone 32. A calcium ion-containing solution containing for example from about 0.1 to about 80% by weight, calcium chloride is passed through inlet 33 into such calcium chloride addition zone to precipitate calcium tungstate. The pH adjustment previous to calcium chloride addition will have raised the temperature of the solution from 10 to 15 degrees by heat of neutralization. Therefore, the precipitation will take place at about a temperature of about 60 or more degrees centigrade in such calcium chloride addition zone. Within approximately 15 minutes precipitation is complete and the slurry of calcium tungstate is passed through line 34 to filter zone 35. The precipitate is washed by the addition of water passing into filter zone 35 through inlet 36. Calcium tungstate is recovered from the filter zone by means of outlet 37 while the filtrate containing hydrochloric acid is recycled through outlet 38 back to the pH adjustment zone 30.

Figure 3:
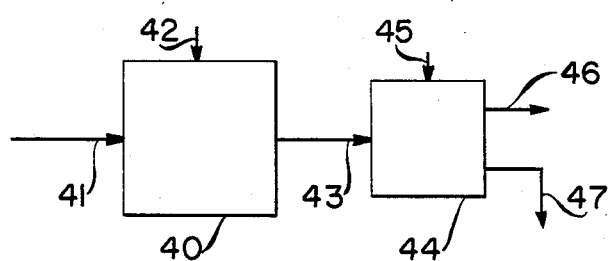
FIG. 3 illustrates a flow diagram of an alternative embodiment for the recovery of tungsten from a stripping solution.

FIG. 3 shows a less preferred embodiment for the recovery of the tungsten from the stripping solution. In this embodiment the tungsten containing solution is passed into reactor 40 which is in fluid communication with the outlet from the tungsten recovery zone 21. Hydrochloric acid, preferably concentrated aqueous HCl, is passed into said reactor through inlet 40(a) to lower the pH to less than about 0.5, e.g. 0.4. Suitably about 0.01 lbs. of hydrochloric acid will be utilized per pound of solution in this zone. HCl addition is achieved by passing the solution through inlet 42 into said reactor 40. A precipitate of tungsten oxide ($WO_3$) is passed through outlet 43 into filter zone 44 wherein the tungsten oxide is separated from the solution and washed by water passed through inlet 45 into filter zone 44. Tungsten oxide is removed through outlet 46 and the filtrate at a pH of about 0.5 is recycled to wash water reservoir 17 from outlet 47.

The following are working examples illustrating the above invention. There is no intention that the claims be limited to such working examples.

EXAMPLE 1

To a 100 ml of a solution containing 404 g/l of Fe(NO$_3$)$_3$·9H$_2$O, 300 ml of a 1N ammonium hydroxide solution were added with slow stirring at a rate of 2 drops/second. The temperature was 24.5° C. and the slurry was stirred for 35 minutes after completion of the NH$_4$OH addition. The reddish-brown slurry was filtered and washed with a small volume of deionized water, e.g. about 3 times the volume of the filter cake. The filter cake was dried at 100° C. in an oven overnight, yielding 8.250 g of a glossy, black material containing 57.8% Fe$^{+3}$ and 3.44% NO$_3$ and no NH$_4$$^+$. An X-ray powder diffraction analysis showed no peaks indicating the material to be amorphous. No pores or other openings were observed under visible light microscopy or by scanning electron microscopy up to 20,000×; however, transmission electron microscopy showed a very uniform distribution of 350Å spherical pores.

A 0.500 g sample of the black material was put in 50 ml of a 58 mg/l W solution at pH 9.5 made from Na$_2$WO$_4$·2H$_2$O. After 3 hours, the tungstate concentration in the solution was 1 mg/l, the detection limit of the analytical method. Other tests showed the capacity to be 10.8 mg W/g. A column made from a larger batch demonstrated tungstate extraction from a Trona brine (See Table 1 below) at flow rates up to 6.75 gal/min/ft$^2$ with breakthrough at a loading of 2.4 mg W/g.

TABLE 1

| BRINE ANALYSIS | |
|---|---|
| Constituent | Brine, wt % |
| KCl | 4.90 |
| Na$_2$CO$_3$ | 4.75 |
| NaHCO$_3$ | 0.15 |
| Na$_2$B$_4$O$_7$ | 1.58 |
| Na$_2$B$_2$O$_4$ | |
| Na$_2$SO$_4$ | 6.75 |
| Na$_2$S | 0.12 |
| Na$_3$AsO$_4$ | 0.05 |
| Na$_3$PO$_4$ | 0.14 |
| NaCl | 16.10 |
| H$_2$O (by difference) | 65.46 |
| WO$_3$ | 0.008 |
| Br | 0.085 |
| I | 0.003 |
| F | 0.002 |
| Li$_2$O | 0.018 |

EXAMPLE 2

Preparation of the Novel Hydrous Oxide of Iron

The precipitation of ferric hydroxide with base is a very well known procedure. However, it is believed that no material has ever heretofore described which corresponds to the instant novel hydrous oxide of iron. The common material obtained by the precipitation and drying of the prior art precipitate is a reddish-brown, earthy material which has very fine particle size and therefore does not make very good packed columns. It has been found that when the critical process for the preparation of the instant novel black iron oxyhydroxide is not followed, the prior art earthy, brownish-red material is obtained. In order to determine the optimum method of preparation of the novel hydrous oxide of iron a large number of parameters was investigated. These were: (a) the type of iron salt used, (b) the type of base used to precipitate the iron, (c) the rate of the base addition, (d) the concentration of the reagents, (e) amount of washing of the precipitate, (f) the drying temperature, and (g) crushing and sizing of the product. The optimum preparation method is first described followed by detailed description of the effects of varying these parameters.

Optimum Synthesis Conditions

A one molar ferric nitrate solution is prepared by dissolving 404 grams of ferric nitrate hexahydrate in enough water to make one liter. Three liters of one molar ammonium hydroxide solution is also made up. The ammonium hydroxide is then added to the ferric nitrate solution at a rate of approximately 2 drops per second while stirring at about 200 rpm. The ammonium hydroxide is added until the reddish-brown slurry becomes viscous. Usually it requires about 30 to 50 ml over the theoretical 3.0 L of ammonium hydroxide to reach this viscous point. The slurry is stirred for about 60 minutes. The reddish-brown slurry is then filtered using #2 Whatman filter paper followed by 2 washes with neutral water, each wash volume approximately that of the filter cake size. After the filter cake is sucked as dry as possible, the solids are transferred to a drying tray and dried overnight in an oven at 100° C. During the drying the reddish-brown solids turn to hard, chunky, black material which is ground to yield a product containing particles passing through −35 mesh screen and retained on a +100 mesh screen (That is, the product has a particle size of −35 +100). Columns made of particles in this size range have minimal flow resistance and extract tungsten very well. Once the precipitation of the novel hydrous oxide of iron has begun, the preparation should not be interrupted since reactions continue to take place which would eventually yield an undesirable crystalline product.

Any variation of the above synthesis conditions produced a different material with different properties. Table 1 (below) contains a short qualitative summary of the physical properties of the products obtained by varying the synthesis conditions. This data shows that the physical properties of the product are very sensitive to the conditions under which it is made. Only under the standard preparatory conditions was a high yield of hard, shiny black FeOOH consistently obtained. Exclusive formation of black FeOOH is desirable because only this material exhibited the combination of low flow resistance in packed columns and high tungsten uptake capacities, as will be shown below.

TABLE 1a

Parametric Study of the Preparation of the Novel Hydrous Oxide of Iron ("Black" FeOOH)

Standard Synthesis
1. 1.0M Fe(NO$_3$)$_3$ (1000 ml) @ Room Temperature.
2. 1.0M NH$_4$OH (3000 ml) @ Room Temperature.
3. Add NH$_4$OH at 1.8 drops/sec while stirring at ~200 rpm until precipitate becomes viscous.
4. Stir slurry about 60 minutes after termination of the NH$_4$OH addition.
5. Filter through #2 Whatman ™ paper.
6. Solids washed with 2×400 ml washes (pH~7).
7. Solids dried overnight @ 100° C.
8. Grind solids to −35 +100 mesh.

Conclusions

1. Pure "Black" FeOOH produced with Fe(NO₃)₃+NH₄OH Red and Brown products with FeCl₃ and Fe₂(SO₄)₃+NaOH and KOH.
2. Tungsten uptake very sensitive to base type: NH₄OH>>NaOH=KOH.
3. If excess base added while precipitating, unfilterable colloids produced.
4. If precipitate washed with water pH≧9, peptization of colloid occurred; red or brown product with low tungsten capacity.
5. Fe(NO₃)₃+NH₄OH (1M each) produced material with high micro-porosity (∼350 Å pores) and high surface area (160 m²/g)—other preps, showed little porosity.
6. Poor tungsten loading and physical properties when 3 molar solutions of reagents used.
7. Rate of addition of base has minor effects.
8. Poorer tungsten loading when dried at 150° C.
9. No advantage of grinding product <100 mesh; low loading observed with ¼" particles.

Each of the important factors in the preparation of the black FeOOH was varied while holding the rest of the conditions constant according to the standard conditions presented above. Throughout this section it is assumed that only the variable being discussed is being changed while the rest are constant, according to the "standard" synthetic conditions. In this way the criticality of the instant novel process for the preparation of the novel hydrous oxide of iron as a function of each variable is demonstrated.

EXAMPLE 3

Variation of the Iron Salt Starting Material

The criticality of the iron salt utilized in the instant process was tested by using 3 different iron compounds, ferric chloride, ferric nitrate, and ferric sulfate. Of these 3 compounds both ferric chloride and ferric sulfate have anions which tend to bind to iron fairly strongly and therefore could complex Fe³⁺ in the solution from which the FeOOH is precipitated. Ferric nitrate, on the other hand, is highly dissociated in solution and probably would behave nearly as a pure hydrated ferric ion and nitrate ion.

The products of reactions using ferric chloride and ferric sulfate had much poorer physical properties: red or reddish-brown colored, virtually no particle integrity, and high production of very fine and colloidal particles in the presence of the brine during the tungsten extraction. The tungsten loading capacities of products of different ferric salts are shown in Table 2.

Although use of ferric chloride is attractive due to its much lower cost than ferric nitrate, the resulting product is useless as an adsorbent in a packed column.

TABLE 2

EFFECT OF FERRIC SALT ON THE TUNGSTEN LOADING OF THE PRODUCT

| Sample No. | Iron Salt | Other Conditions | Physical Form | Tungsten[a] Loading (mg/g) |
|---|---|---|---|---|
| 139-1 | Fe(NO₃)₃ | "Standard" | Large black chunks | 20 |
| 152-1 | Fe(NO₃)₃ | "Standard" except base added all at once. | Large black chunks | 32 |
| 147-1 | FeNO₃ | "Standard" except no wash. | Small black particles | 64 |
| 141-1 | FeCl₃ | "Standard" | Fine red powder | 29 |
| 160-1 | FeCl₃ | "Standard" except dried at 20° C. | Semi-solid gel | No solid Product |
| 160-2 | FeCl₃ | "Standard dried at 150° C. | Fine dark red powder | 22 |
| 142-1 | Fe₂(SO₄)₃ | "Standard" | Fine red powder | 29 |
| 149-1 | Fe₂(SO₄)₃ | "Standard" dried at 150° C. | Fine red powder | 29 |

[a]See below for procedure measured in accordance with method of Example 1 except that 100 ml of tungsten solution was utilized.

For example a 1" diameter, 48" tall column was loosely packed with the product prepared from FeCl₃. The attached pump was strained to its limits and produced a 1-2 ml/min flow through this column at about 200 psi. In contrast, the same column packed with the novel hydrous oxide of iron at −35 +60 mesh allowed flow rates above 300 ml/min. (15 gal/min/ft²) at 40-50 psi. Clearly, the counter ion of the ferric salt plays a role in the formation of the precipitated product, although the precise nature of this role is uncertain.

EXAMPLE 4

Variation of the Type of Base Used to Precipitate the Ferric Hydroxide Precursor The hydrolysis of ferric iron in aqueous solution can be accomplished by raising the pH of the solution with virtually any base, giving rise to the reddish-brown, Fe(OH)₃.xH₂O precipitate. However, it was discovered that the only bases which produced the instant novel hydrous oxide of iron upon drying this precipitate was ammonium hydroxide and amines. In addition, the uptake of tungsten on the dried products showed that sodium or potassium hydroxide produce products with decidedly inferior tungsten capacities.

The reason for the sensitivity of the preparation to sodium or potassium ions is not at all clear. While not wishing to be bound by any theory, it is believed that the difference may lie in the fact that aqueous NH₃ as well as the amines are weak bases.

For example:

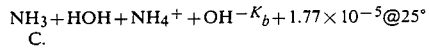

$$NH_3 + HOH + NH_4^+ + OH^- \; K_b + 1.77 \times 10^{-5} @ 25° C.$$

whereas NaOH and KOH are nearly completely dissociated at these concentrations (1M). The 1.0M ammonia solution is only 0.0042M in NH⁺ and OH⁻. In addition, Na⁺ and K⁺ are hydrated to different degrees in aqueous solutions with approximate hydration numbers of 16.6 and 10.5, respectively. The hydration of NH₄⁺ is extremely complicated, involving water molecules cross linked by O—H...N and O...H—N bonds into three-dimensional networks. Undoubtedly, these differences cause the reaction mechanism and the detailed structure of the precipitated Fe(OH)₃.xH₂O product to differ between NH₃(aq), NaOH, and KOH. As disclosed other weak bases such as amines are effective as NH₄OH in preparing the instant novel hydrous oxide of iron, although the tungsten loading capacity is somewhat inferior.

TABLE 3

EFFECT OF BASE TYPE ON TUNGSTEN LOADING OF THE PRODUCT

| Sample No. | Base | Conditions | Physical Form | Tungsten Loading (mg/g) |
| --- | --- | --- | --- | --- |
| 139-1 | NH$_4$OH | Standard | Large black chunks | 20 |
| 152-1 | NH$_4$OH | Standard except base added all at once. | Large black chunks | 32 |
| 147-1 | NH$_4$OH | Standard except no wash. | Small black particles | 64 |
| 153-2 | NaOH | Standard | Brown powder | 5 |
| 148-1 | NaOH | FeCl$_3$ & Standard | Brown powder | 4 |
| 149-1 | NaOH | Fe$_2$SO$_4$ & Standard | Red powder | 2 |
| 150-1 | NaOH | FeCl$_3$ & Standard except base added all at once | Red powder | 2 |
| 159-1 | KOH | Standard | Brown powder | 2.9 |
| 92-1 | Di-ethylamine | Standard | Large black chunks | 7 |
| 91-1 | Quinoline | Standard | Large black chunks | 4 |

EXAMPLE 5

Rate of Base Addition

Instantaneous addition of the aqueous ammonia solution to the ferric nitrate solution could result in an inhomogeneous product since solid products are immediately formed. However, since the mixture is stirred for 1 hour, the net effect of this initial high concentration gradient is minor. Table 4 shows the tungsten loading capacities on products prepared with different rates of addition of base. If the base is added over a period of hours, eventually undesirable crystalline products are produced.

TABLE 4

EFFECT OF RATE OF BASE ADDITION ON THE TUNGSTEN LOADING

| Sample No. | Base Addition Rate (drops/sec) | Conditions | Physical Form | Tungsten Loading (mg/g) |
| --- | --- | --- | --- | --- |
| 139-1 | 1.8 | "Standard" | Large black chunks | 20 |
| 140-1 | ~1250 | "Standard" | Large black chunks | 22 |

EXAMPLE 6

Reagent Concentration

Colloids tend to aggregate in concentrated solutions, which is undesirable, while use of very dilute solutions would require hugh process equipment for production of small amounts of the product. A balance between these constraints must be achieved. The use of 3M solutions of reagents produced a product which, while completely black, was very brittle, crumble, and highly contaminated with NO$_3^-$ and NH$_4^+$. In addition, poorer tungsten loading capacities were obtained as shown in Table 5.

TABLE 5

EFFECT OF REAGENT CONCENTRATION ON THE TUNGSTEN LOADING

| Sample No. | Reagent Concentration | Conditions | Physical Form | Tungsten Loading (mg/g) |
| --- | --- | --- | --- | --- |
| 143-2 | 3 M Fe(NO$_3$)$_3$ 3 M NH$_4$OH | "Standard" | Large black chunks & red powder | 4.6 |
| 161-1 | 1 M Fe(NO$_3$)$_3$ 14.8 M NH$_4$OH | "Standard" | Brown-red chunks[a] & powder | 14.8 |
| 152-1 | 1 M Fe(NO$_3$)$_3$ 1 M NH$_4$OH | "Standard" | Large black chunks | 32 |

[a] Sample when ground yielded a powder of −200 mesh which was unsuitable for use in a packed column.

EXAMPLE 7

Washing the Precipitate

Washing the filter cake from the hydrolysis/precipitation reaction removes NH$_4^+$ and NO$_3^-$ ions from the product before drying. Because ammonium nitrate can form and can be transported out of the filter cake during drying by sublimation, it is desirable to remove as much of the NH$_4^+$ and NO$_3^-$ ions as possible to avoid NH$_4$NO$_3$ vapors in the oven. However, in preparations where large amounts of wash water were used, peptization of the precipitate may occur on the filter, resulting in colloidal Fe(OH)$_3$ particles pass through the filter paper into the filtrate. Besides the resulting loss in yields, there usually was a dramatic decrease in the rate of filtration. One preparation did not filter at all when washed with four filter cake volumes of water. As long as the conditions favoring peptization are avoided, no problems are encountered in the washing step. The relationship between the tungsten loading capacity and the wash liquor volume is demonstrated in Table 6.

TABLE 6

EFFECT OF WASHING THE PRECIPITATE ON THE TUNGSTEN LOADING OF THE PRODUCT

| Sample No. | Wash Conditions | Physical Form | Tungsten Loading |
| --- | --- | --- | --- |
| 140-1 | Two 400 ml Dionized Water washes | Hard & black | 22 mg/g |
| 146-2 | 120 ml wash until acidic | Soft, small particles | 5.6 mg/g |
| 147-1 | No wash | Soft, brown particles[a] | 64 mg/g |
| 64-4 | Two 400 ml washes; pH = 6.0 | Hard & black | 11.6 mg/g |
| 65-2 | Two 400 ml washes; pH = 8.0 | Hard & black long filtering time | 18.2 mg/g |
| 66-B | Proposed two 400 ml washes; pH = 9.0 | Ppt did not filter after 200 ml | — |

[a] See Example 6 above.

EXAMPLE 8

Drying Temperature

The reddish-brown washed filter cake dries to hard, shiny, black chunks in the oven. If allowed to air dry at room temperature, some of the material will form the reddish-brown, earthy material instead of the desired hard black material in addition to requiring several weeks to dry completely. The drying temperature was varied from room temperature up to 150° C. Temperatures at which the transformation of FeOOH to Fe$_2$O$_3$ is favorable were avoided. Table 7 gives the relationship between the drying temperature and the tungsten loading capacity. This data shows that tungsten uptake is not strongly influenced by the drying temperature at temperatures below about 150° C. Therefore, the material should be dried at a temperature within these limits which is convenient in terms of energy usage and drying time.

TABLE 7
EFFECT OF DRYING TEMPERATURE OF THE PRECIPITATE ON THE TUNGSTEN LOADING

| Sample No. | Drying Conditions | Physical Form | Tungsten Loading (mg/g) |
|---|---|---|---|
| 157-1 | 20° C. overnight | Red and black powder | 44.30[a] |
| 152-1 | 50° C. overnight | Hard & black; excess amount of fines. | 31.65 |
| 140-1 | 100° C. overnight | Hard & black; few fines | 21.65 |
| 161-1 | 150° C. overnight | Small particles; hard & black; few fines. | 14.84 |

[a]See Example 6 above.

EXAMPLE 9

Crushing and Particle Sizing of Black FeOOH

The chunky black product must be broken down into smaller particles, preferably of uniform size so that packed columns will have good flow and fluid contact characteristics. The black material chunks are surprisingly hard but are also rather brittle. It has been observed that when the chunks are ground to dust with a mortar and pestle, the resulting material is actually reddish-brown colored rather than black. This suggests that the black color is purely an optical absorption effect of the particles themselves, i.e. light impinging on the surface is entirely absorbed and virtually no reflected light.

The production of fines in the grinding step is undesirable because the particles loose their distinctive granular properties, contributing to low flow rates in columns (or high pressure drops) as well as cutting down on the yield of good material. If the dried hydrous oxide of iron is ground with mortar and pestle an excessive amount of fines will result. However, state-of-the-art grinding technology (such as use of a roll crusher) will provide the material in a useful particle size range.

The optimum particle size range is dictated by the trade off between two factors: (1) diffusion of fluids is faster into smaller particles resulting in faster tungsten adsorption rates for small particles and (2) smaller particle sizes pack more tightly into columns and impede the flow of fluid. The −35 +100 mesh materials give a reasonable balance of the above factors. It is noted that most commercial ion exchange resin beads are usually about this size.

EXAMPLE 10

Black FeOOH Prepared with Organic Base

To 100 ml of a 1M $Fe(NO_3)_3$ solution, 300 ml of an aqueous solution containing 1 mole/liter of diethylamine was added over a 10 minute period. As in the case when ammonium hydroxide was used, the solution became quite viscous and the slurry turned a reddish-brown color. Stirring of the slurry continued for 90 minutes and then was filtered and washed with approximately 50 ml of deionized water. The reddish-brown filter cake was dried in an oven at 100° C. for 6 hours. The material was transformed into hard, shiny, black chunks which weighed 8.396 g. In a similar preparation, quinoline was substituted for diethylamine and, produced 9.565 g of very shiny, black material which was extremely brittle and friable. Because of limited solubility, the pure quinoline was added directly to the 1M $Fe(NO_3)_3$ solution.

An apparatus was constructed to implement the process described. A column with dimensions of 0.895" I.D and 47" high was filled with 667 g of the adsorbent prepared by the method described in Example 1 and crushed to a −35 +100 mesh size. Automatic switching valves controlled the flow of brine, wash water, and stripping solution. Brine containing 70 mg/l of tungsten at a pH of 9.6 was pumped through the column at rates between 1 and 7 gal/min/ft$^2$ until the effluent from the column contained >1 mg W/l, which amounted to a total of 214 liters of brine and corresponded to an adsorbent loading of 22.5 mg W/g. The column was then washed with water at a rate of 7 gal/min/ft$^2$ for 5 minutes. Then a 1M NaOH solution was pumped through at 1 gal/min/ft$^2$ to strip off the loaded tungsten and the effluent tungsten concentration monitored. A peak concentration of 12.7 g/l of tungsten was quickly achieved and a total of 5 liters of solution passed through containing an average of 4 g/l W. The column was then packed with water and reloaded with brine.

To test the adsorbent lifetime, the 47" long column was replaced with a 4" column containing 62 g of the adsorbent. This was loaded with natural Searles Lake brine, washed, stripped with 1M NaOH, washed, and the cycle repeated 88 times. After this the adsorbent was removed from the column and weighed (62.7 g), showing no detectable weight loss. The tungsten adsorption capacity of this material was unchanged from the starting adsorbent.

I claim:
1. A process for the recovery of molybdenum and/or tungsten from a solution which comprises the steps of:
    (a) passing said solution through a packed column containing an adsorbent,
    (b) adsorbing tungsten and/or molybdenum on said adsorbent,
    (c) passing a solution depleted in tungsten and/or molybdenum from said column,
    (d) passing a stripping solution through said column containing tungsten and/or molybdenum on said adsorbent to remove tungsten and/or molybdenum with said stripping solution,
    (e) repeating steps (a) through (d) until the stripping solution contains at least about 1 gram per liter of tungsten and/or molybdenum,
    (f) passing said solution containing at least about 1 gram of tungsten and/or molybdenum per liter into a recovery zone,
    (g) adjusting the pH of said stripping solution containing at least about 1 gram per liter of tungsten and/or molybdenum to approximately 13.0 by addition of a strong acid and thereby raising the temperature of said solution at least about 10° C.,
    (h) adding a calcium ion-containing solution to said pH adjusted solution to precipitate calcium tungstate and/or calcium molybdate, and
    (i) recovering said precipitate of tungsten and/or molybdenum as calcium tungstate and/or calcium molybdate.
2. The process of claim 1 wherein said adsorbent comprises a hydrous oxide selected from the group consisting of iron and manganese hydrous oxides, and further comprising maintaining the pH of said solution of step (a) at at least about 6.

3. The process of claim 2 wherein said adsorbent comprises a hydrous oxide having the general formula FeO(OH).

4. The process of claim 2 further comprising passing wash water through said column prior to step (d).

5. The process of claim 4 further comprising passing wash water through said column prior to repeating step (a).

6. The process of claim 5 wherein said strong acid comprises hydrochloric acid.

7. The process of claim 6 wherein said calcium ion-containing solution comprises from about 0.1 to about 80%, by weight, calcium chloride.

8. The process of claim 7 further limited to the recovery of tungsten.

9. A process for the recovery of molybdenum and/or tungsten from a solution which comprises the steps of:
(a) passing said solution through a packed column containing an adsorbent,
(b) adsorbing tungsten and/or molybdenum on said adsorbent,
(c) passing a solution depleted in tungsten and/or molybdenum from said column,
(d) passing a stripping solution through said column containing tungsten and/or molybdenum on said adsorbent to remove tungsten and/or molybdenum with said stripping solution,
(e) repeating steps (a) through (d) until the stripping solution contains at least about 1 gram per liter of tungsten and/or molybdenum,
(f) passing the solution containing at least about 1 gram of tungsten and/or molybdenum per liter into a recovery zone,
(g) adjusting the pH of said stripping solution containing at least about 1 gram per liter of tungsten and/or molybdenum to less than about 0.5 to precipitate tungsten oxide and/or molybdenum oxide, and
(h) recovering said precipitate of tungsten and/or said molybdenum as tungsten oxide and/or molybdenum oxide.

10. The process of claim 9 wherein said adsorbent comprises a hydrous oxide selected from the group consisting of iron and manganese hydrous oxides, and further comprising maintaining the pH of said solution of step (a) at at least about 6.

11. The process of claims 2 or 10 wherein said molybdenum comprises molybdate ion.

12. The process of claims 2 or 10 wherein said tungsten comprises tungstate ion.

13. The process of claim 10 wherein said adsorbent comprises a hydrous oxide having the general formula FeO(OH).

14. The process of claim 13 further comprising passing wash water through said column prior to step (d).

15. The process of claim 14 further comprising passing wash water through said column prior to repeating step (a).

16. The process of claim 15 comprising adjusting the pH of said stripping solution with hydrochloric acid.

17. The process of claim 16 further limited to the recovery of tungsten.

18. The process of claims 8 or 15 wherein said tungsten comprises tungstate and said solution of step (a) further comprises anions selected from the group consisting carbonate, bicarbonate, sulfate, halide, borate, hydroxide, and mixtures thereof.

19. A process for the recovery of molybdenum and/or tungsten from a solution having a pH of at least about 6 which comprises the steps of:
(a) passing said solution through a packed column containing an adsorbent comprising a high surface area hydrous oxide of iron prepared by contacting an aqueous solution of a highly dissociated ferric salt with ammonium hydroxide,
(b) adsorbing tungsten and/or molybdenum on said adsorbent,
(c) passing a solution depleted in tungsten and/or molybdenum from said column,
(d) passing a stripping solution through said column containing tungsten and/or molybdenum on said adsorbent to remove tungsten and/or molybdenum with said stripping solution,
(e) repeating steps (a) through (d) until the stripping solution contains at least about 1 gram per liter of tungsten and/or molybdenum,
(f) passing said solution containing at least about 1 gram of tungsten and/or molybdenum per liter into a recovery zone,
(g) adjusting the pH of said stripping solution containing at least about 1 gram per liter of tungsten and/or molybdenum to approximately 13.0 by addition of a strong acid and thereby raising the temperature of said solution at least about 10° C.,
(h) adding a calcium ion-containing solution to said pH adjusted solution to precipitate calcium tungstate and/or calcium molybdate, and
(i) recovering said precipitate of tungsten and/or molybdenum as calcium tungstate and/or calcium molybdate.

20. A process for the recovery of molybdenum and/or tungsten from a solution having a pH of at least about 6 which comprises the steps of:
(a) passing said solution through a packed column containing an adsorbent comprising a high surface area hydrous oxide of iron prepared by contacting an aqueous solution of a highly dissociated ferric salt with ammonium hydroxide,
(b) adsorbing tungsten and/or molybdenum on said adsorbent,
(c) passing a solution depleted in tungsten and/or molybdenum from said column,
(d) passing a stripping solution through said column containing tungsten and/or molybdenum on said adsorbent to remove tungsten and/or molybdenum with said stripping solution,
(e) repeating steps (a) through (d) until the stripping solution contains at least about 1 gram per liter of tungsten and/or molybdenum,
(f) passing the solution containing at least about 1 gram of tungsten and/or molybdenum per liter into a recovery zone,
(g) adjusting the pH of said stripping solution containing at least about 1 gram per liter of tungsten and/or molybdenum to less than about 0.5 to precipitate tungsten oxide and/or molybdenum oxide, and
(h) recovering said precipitate of tungsten and/or said molybdenum as tungsten oxide and/or molybdenum oxide.

* * * * *